United States Patent [19]

Grossman et al.

[11] Patent Number: 5,180,911
[45] Date of Patent: Jan. 19, 1993

[54] PARAMETER MEASUREMENT SYSTEMS AND METHODS HAVING A NEURAL NETWORK COMPRISING PARAMETER OUTPUT MEANS

[75] Inventors: Barry G. Grossman, Satellite Beach; Frank M. Caimi, Vero Beach, both of Fla.

[73] Assignees: Harbor Branch Oceanographic Institution, Inc., Ft. Pierce; The Florida Institute of Technology, Inc., Melbourne, both of Fla.

[21] Appl. No.: 753,983

[22] Filed: Sep. 3, 1991

[51] Int. Cl.⁵ .............................. H01J 5/16
[52] U.S. Cl. .................. 250/227.21; 395/22
[58] Field of Search .......... 250/551, 227.23, 227.21; 395/21, 22, 23; 73/800

[56] References Cited

U.S. PATENT DOCUMENTS 5,099,114  3/1992  Matsumoto et al. .......... 250/227.33

Primary Examiner—David C. Nelms
Assistant Examiner—T. Davenport
Attorney, Agent, or Firm—Carroll F. Palmer

[57] ABSTRACT

A system for measuring the value of a parameter, e.g., structural strain, includes an optical waveguide, a laser or equivalent light source for launching coherent light into the waveguide to propagate therein as multi modes, an array of a plurality of spaced apart photodetectors each comprising a light receptor surface and signal output, said array being arranged to have light emitted from said waveguide output portion irradiate said light receptor surfaces, an artificial neural network formed of a plurality of spaced apart neurons, connectors to impose weighted portions of signal outputs from the photodetectors upon the neurons which register the parameter value on a meter or like output device.

14 Claims, 3 Drawing Sheets

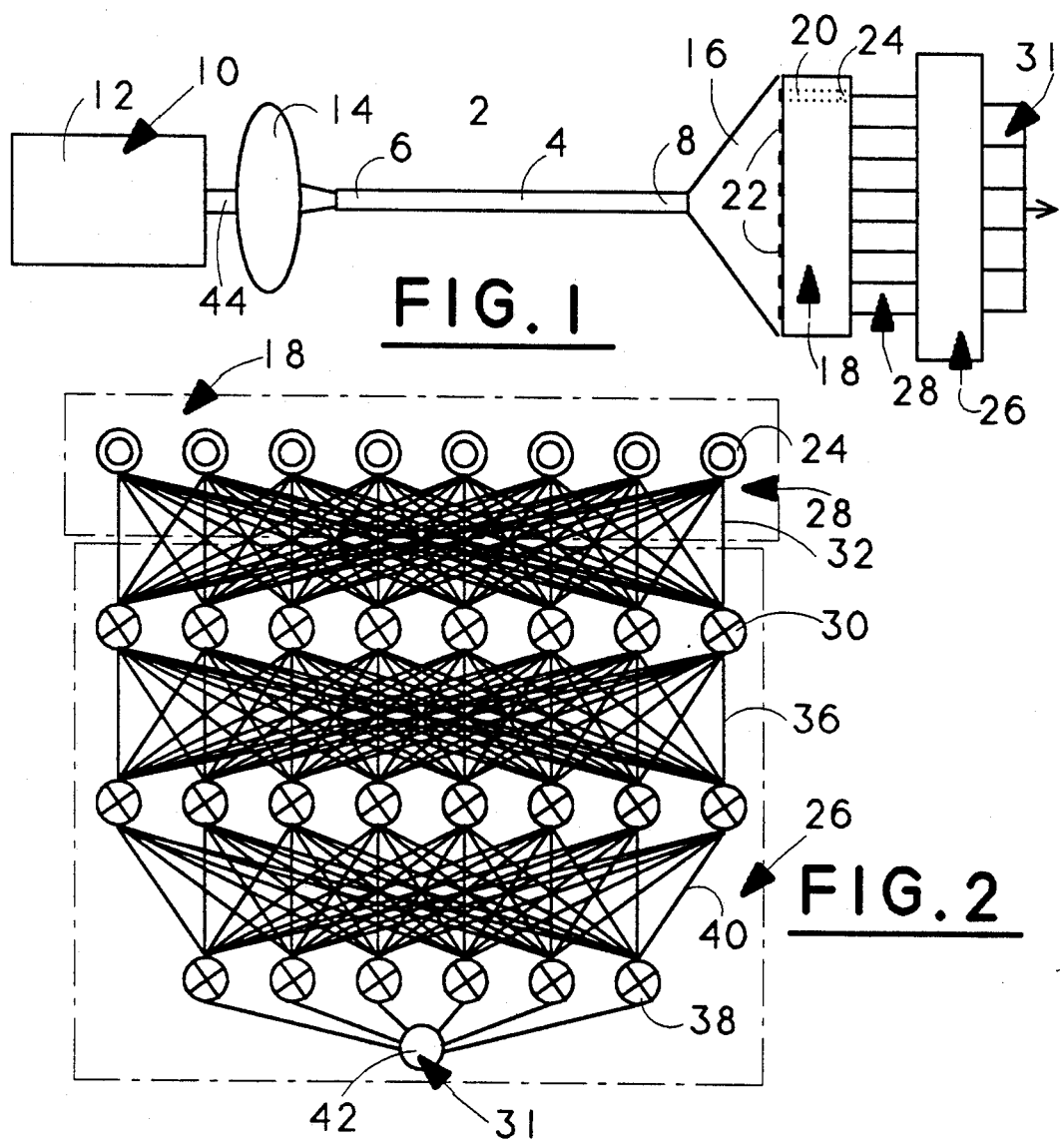
FIG. 1
FIG. 2
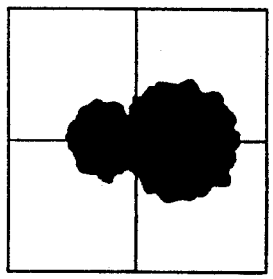
FIG. 3
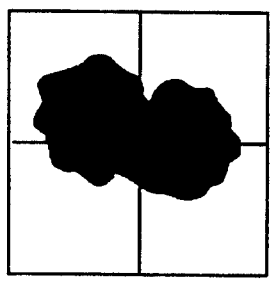
FIG. 4
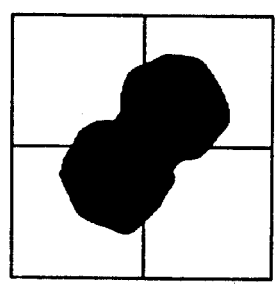
FIG. 5

ORIGINAL REPEAT
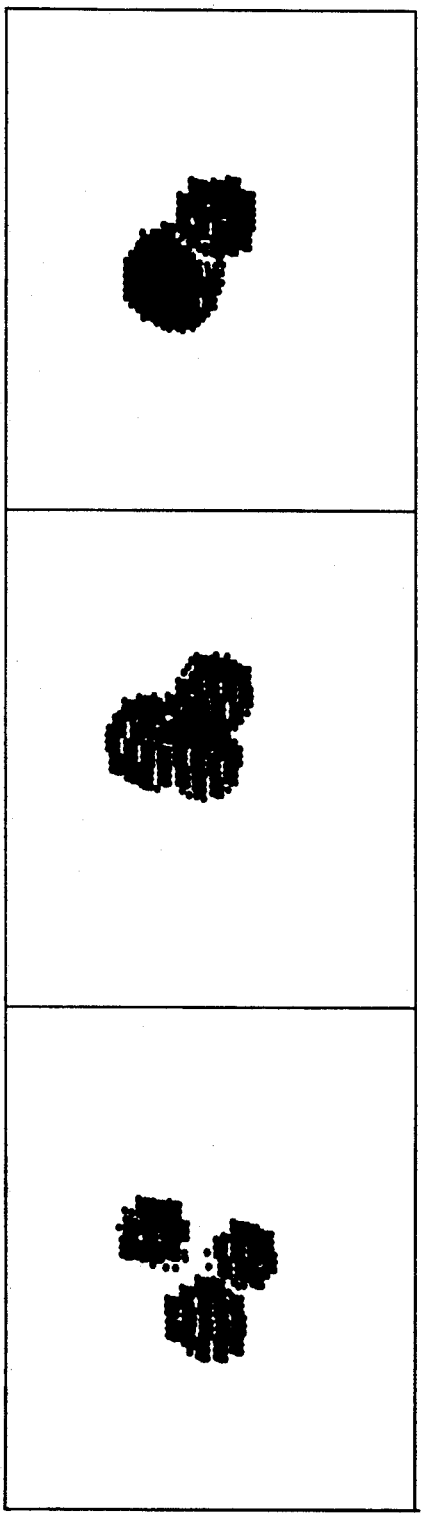
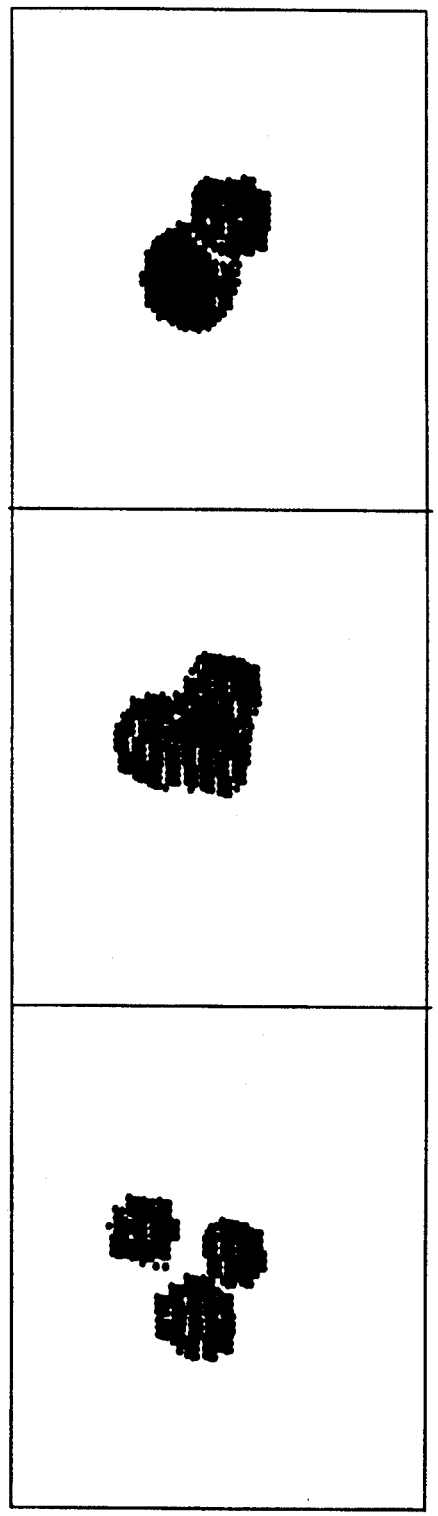
100 $\mu\varepsilon$
500 $\mu\varepsilon$
1000 $\mu\varepsilon$
FIG. 8
FIG. 9

PARAMETER MEASUREMENT SYSTEMS AND METHODS HAVING A NEURAL NETWORK COMPRISING PARAMETER OUTPUT MEANS

BACKGROUND OF THE INVENTION

1. Field of the Invention

This application relates to systems and methods for measurement of a variety of parameters, e.g., strain, temperature, pressure, etc. More particularly, it concerns such systems and methods that comprise unique combinations of optical waveguides, e.g., optical fibers, operated in multi-mode to generate modal interference patterns and neural networks to interpret such patterns to obtain a value for the parameter being measured.

2. Description of the Prior Art

The use of optical fibers for the sensing of strain is well-known and this has been done in a variety of applications, e.g., see U.S. Pat. Nos. 4,295,738; 4,611,378; 4,653,906 and 4,947,693.

Several different classes of optical sensors have been investigated, each having particular advantages and disadvantages. One class of particular interest is the "few-mode" sensor in which an optical fiber is used that will support two or more lower order propagation modes. As the fiber is subjected to strain, the effective propagation constant for each of the modes is altered in such a way that the relative phase between each mode is shifted a different amount in proportion to the strain. Thus, at the output end of the fiber, all propagating modes interfere, producing an intensity pattern in space which varies with the induced strain. If the fiber is constructed so only the two lowest order modes propagate therein, the interference of these results in two intensity lobes at the output. The light intensity is measured by a photodetector within the spatial illumination area of one of the lobes. As the applied strain is increased, the intensity pattern alternates through successive light/dark transitions (fringes) producing a sinusoidal output signal from the photodetector. To process the detected signal, the modes must be constrained not to rotate with respect to each other. If this is not done, for example in the case of a sensor made from standard circular core fiber, at higher strain levels the intensity pattern rotates so an elliptical core fiber is used to prevent such pattern rotation. Thus, the usual two mode sensor has limited dynamic range and requires special and expensive optical fibers to operate.

If one looks at the other extreme, i.e., the use of standard, low cost, multimode optical fiber where hundreds or thousands of modes propagate, the interference pattern, usually referred to as a speckle pattern, is composed of a very intricate and complicated intensity distribution. In this case the pattern is more sensitive to strain and other parameters (e.g., temperature) as compared with the case when only two modes propagate producing patterns that do not repeat over a large range of strain values. However, it is not easy to process the latter output signal to make full use of the sensitivity and dynamic range possible with the N-mode optical fiber sensors. One possibility would be laboriously to store the intensity distribution data for each strain value. To determine an unknown strain value one could then use image processing techniques to correlate stored images with the one produced from the unknown amount of strain thus identifying the unknown strain value. A serious limitation of this technique is that very high resolution imaging systems are required consequently demanding increased computer processing time to obtain a result. This might require a very expensive system where only static (vs. dynamic strain) might be able to be processed due to the long processing time required for segments of the dynamic waveform. The present invention provides new practical systems and methods for making full use of the sensitivity and dynamic range possible with the N-mode optical fiber sensors in measurement of strain, temperature and other parameter values.

OBJECTS

A principal object of the invention is the provision of new systems and methods for measurement of a variety of parameters, e.g., strain, temperature, pressure, etc.

Further objects include the provision of:

1. Such systems and methods that comprise the unique combination of an optical waveguide operated in a multi-mode manner to produce spatial intensity output patterns and neural network signal processing architecture to interpret such patterns to provide a value for a parameter being measured with such system and method.

2. New strain measurement systems and methods that employ low cost, standard circular core optical fibers in contrast to expensive, elliptical core optical fibers typically used in some known fiber optic strain sensors.

3. Such strain measurement systems and methods that can be used to monitor strain in bridges, buildings, aircraft, space structures and vehicles, satellites, ocean vehicles and offshore drilling platforms and other ocean structures.

4. New parameter measurement systems and methods that can be used to measure strain, pressure, compression, temperature, electrical fields, magnetic fields and chemical features.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of a system for measuring the value of a parameter which comprises (a) an optical waveguide having an input portion and an output portion, (b) means for launching coherent light into the input portion to propagate as multi modes in the waveguide, (c) an array of a plurality of spaced apart photodetectors each comprising a light receptor surface and signal output, the array being arranged to have light emitted from the waveguide output portion irradiate the light receptor surfaces of the photodetectors, (d) an artificial neural network comprising at least one layer of a plurality of spaced apart neurons, (e) connector means to operatively impose weighted portions of the photodetector signal outputs upon the neurons and the neural network further comprising (f) parameter value output means.

In preferred embodiments, the neurons are equal at least in number to the numbers of the photodetectors, the artificial neural network comprises a succession of separate layers comprising a first layer of spaced apart neurons and at least second and third layers of spaced apart neurons.

Also, the neurons of the first layer neurons connect with the photodetectors, the second layer neurons connect with the first layer neurons and the third layer neurons connect with the second layers neurons.

Neural networks useable in accordance with the invention may take a variety of forms, for example, see *Neurocomputing: picking the human brain*, by R. Hecht-Nielsen, IEEE Spectrum Magazine, March 1988, ps. 36–41 and *An Introduction to Computing with Neural Nets*, by R. Lippmann, IEEE ASSP Magazine, April, 1987, ps. 4–26, the disclosures of which are incorporated herein by reference.

The advantage of neural networks in the systems of this invention lies both in their capability to analyze complex sensor signal patterns and in their speed in calculating the appropriate paraameter value. For three-layer perceptron networks, such as discussed infra, the processing speed is just three gate delays after off-line training, regardless of the number of inputs and outputs. This results in a total processing time that can be as small as a few tens of nanoseconds or less. The neural network learns the correct "algorithms" by example during training and is able to generalize to untrained inputs after training is completed. The inputs to the neural network are the sampled values of the fiber-optic sensor output intensity distribution, and the neural network output is the parameter value.

Neural nets have been primarily implemented using software simulation programs on conventional computers, but have now been developed in silicon parallel processing chips, optical systems, and hybrid electrooptic systems that use electrooptic components with optical interconnects.

Neural networks are processors that possess, to a very limited extent, some of the capabilities of the brain in learning, memorizing, and reacting. They therefore posses a capability to solve problems that are not easily defined algorithmically and to process parallel inputs in real time.

In a preferred embodiment, the system of the invention is for measuring strain and comprises (A) a longitudinal optical fiber having a core of substantially uniform circular cross-section throughout its length having an input end and an output end, (B) means to launch a beam of coherent light into the input end to propagate though the optical fiber in multi mode and exit the output end as modal spatial intensity patterns, (C) an array of a plurality of spaced apart photodetectors each comprising a light receptor surface and signal output, such array being arranged to permit light emitted from the output end to irradiate the light receptor surfaces to produce an electric signal at the signal output, (D) an artificial neural network comprising a plurality of spaced apart neurons, (E) connector means to operatively impose weighted portions of the photodetector signal outputs upon the neurons and (F) the neural network further comprises strain value output means.

The objects are further accomplished in accordance with the invention by the provision of methods of measuring the value of a parameter which comprises (1) providing an optical waveguide having an input portion and an output portion, (2) imposing some intensity value of the parameter on the waveguide, (3) launching a beam of coherent light into the input portion of the waveguide so that such light propagates as multi modes in the waveguide and exits the output portion as a modal spatial intensity pattern related to the intensity of the parameter, (4) providing an array of a plurality of spaced apart photodetectors each comprising a light receptor surface and signal output arranged to permit light emitted from the waveguide to irradiate the light receptor surfaces, (5) providing an artificial neural network comprising a plurality of spaced apart neurons, (6) imposing weighted portions of the photodector signal outputs upon the neurons and (7) obtaining the value of the parameter from the neural network.

Advantageously, the neural network is subjected to a learning operation before the parameter value is obtained.

A preferred method of measuring the value of strain imposed on a structure comprises (P1) providing a longitudinal optical fiber of substantially uniform circular cross-section throughout its length having an input end and an output end, (P2) imposing some intensity of strain on the optical fiber, (P3) launching a beam of coherent light into the input end to propagate in multi mode along the fiber and exit the output end as modal spatial intensity patterns, (P4) providing an array of a plurality of spaced apart photodetectors each comprising a light receptor surface and signal output arranged to permit light emitted from the fiber output end to irradiate the light receptor surfaces and produce electrical signals at the signal outputs, (P5) providing an artificial neural network comprising a plurality of spaced apart neurons, (P6) imposing weighted portions of the electrical signals upon the neurons via connections between the photodetector signal outputs and the neurons, and (P7) obtaining the value of the strain from the neural network.

BRIEF DESCRIPTION OF THE DRAWINGS

A more complete understanding of the invention can be obtained by reference to the accompanying drawings in which:

FIG. 1 is a diagrammatic representation of a parameter measurement system structured in accordance with the invention.

FIG. 2 is a diagrammatic representation of an artificial neural network forming a part of the system of FIG. 1.

FIGS. 3–5 are, in the top panels, negative photocopies of output signals from a two-mode optical fiber having a circular cross-section core versus induced strain on the fiber showing rotation of modal interference patterns and, in the bottom panels, the light intensity in the patterns along the horizontal lines in the top panels.

FIG. 8 comprises three negative half-tones of modal interference patterns from the output end of N-mode optical fiber having a circular cross-section core with the fiber under the microstrain intensity reported at the right hand side of sheet.

FIG. 9 is similar to FIG. 8 showing the results of a repeat of the operations performed in obtaining the interference patterns of FIG. 8 to evaluate the reproducibility of strain measurements in accordance with the invention.

DESCRIPTION OF THE PREFERRED EMBODIMENTS

Figure 6:
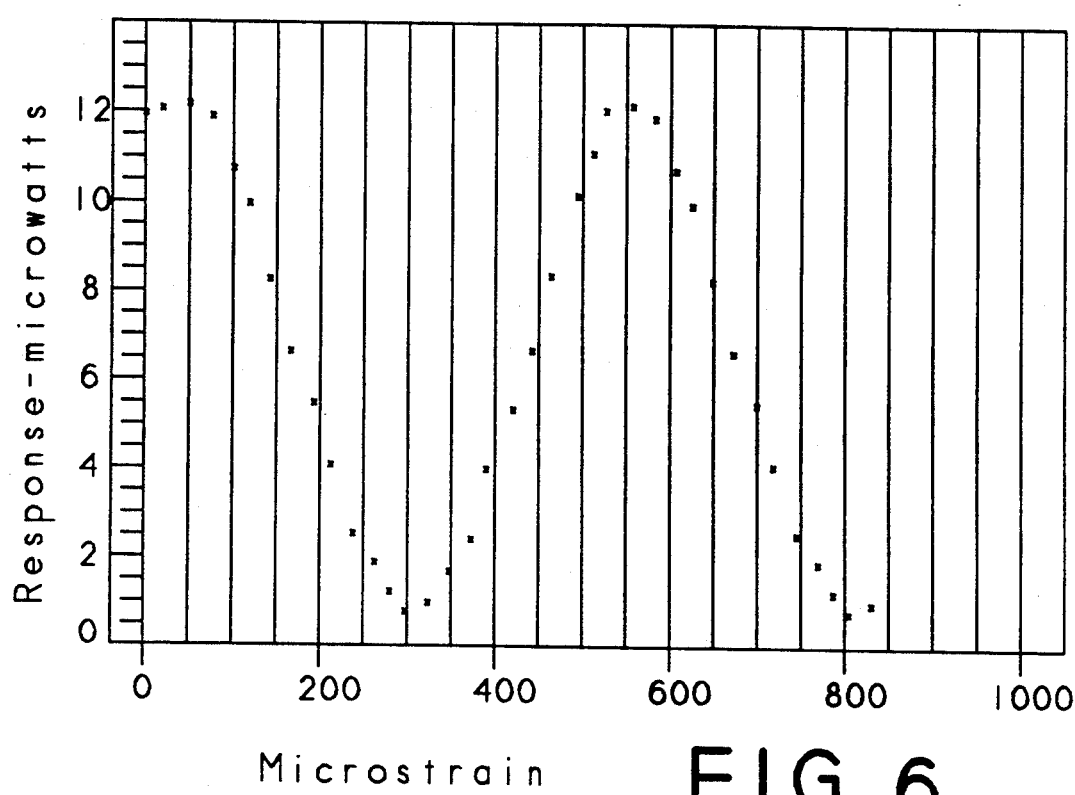
FIG. 6 is a graph showing the output signal from a two-mode y-strain optical fiber having an elliptical core (Andrew E-type) versus strain imposed on such fiber with polarization parallel to the major axis of the fiber.
Figure 7:
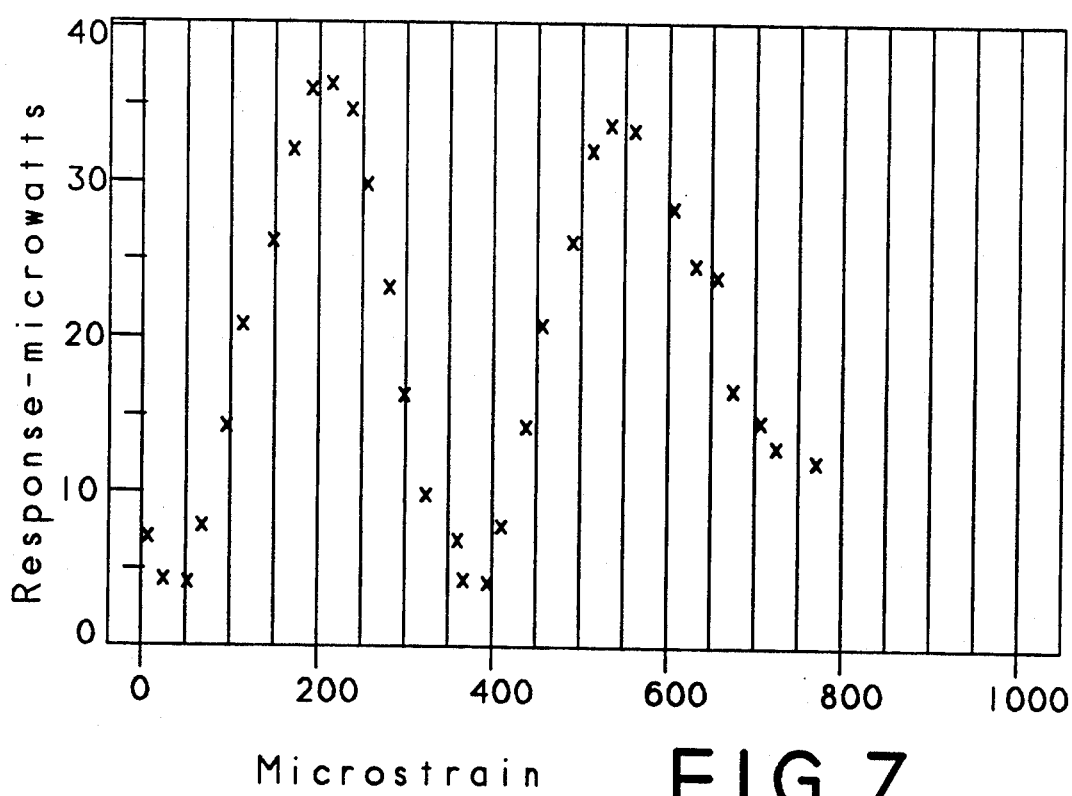
FIG. 7 is a graph showing the output signal from a two-mode y-strain optical fiber having an elliptical core (Andrew E-type) versus strain imposed on such fiber with polarization parallel to the minor axis of the fiber.

In order to relate the systems and methods of the invention to the state of the prior art, a typical response from a two-mode elliptical core optical fiber sensor (LPOI and LPII) is shown in FIGS. 6 and 7 where 250 microstrain is sufficient to cause a complete transition from minimum to maximum detected intensity. The two graphs show that the dynamic range is limited to the unambiguous strain range of one half of a fringe. This is because the intensity varies sinusoidally with strain and thus there are an infinite number of strain values, both positive and negative with the same intensity value. By limiting the strain range to one half of a period, this ambiguity is eliminated. Hence, the optical fiber strain sensors that employ two-mode elliptical core fibers suffer from limited dynamic range in addition to requiring special and expensive optical fibers for operation. The present invention now makes it possible to use inexpensive optical fibers made with cores of circular cross-section and at the same time take advantage of the broad dynamic evaluation ranges associated with such fibers.

With reference to FIG. 1, the system 2 for measuring the value of a parameter, e.g., comprises optical fiber 4 containing a core (not shown) of circular cross-section enclosed by cladding (not shown) having an input end 6 and an output end 8.

Means 10 for launching coherent light into the input end to propagate as multi modes in the optical fiber 4 comprises the laser 12 and focusing lens 14.

The light output 16 from fiber end 8 falls on the array 18 of a plurality of spaced apart photodetectors 20 each comprising a light receptor surface 22 and signal output 24. In the embodiment of FIG. 1, the array 18 is positioned adjacent fiber end 8 so light emitted from the end 8 irradiates the light receptor surfaces 22, but a variety of other arrangements for the array 18 for irradiation of the surfaces 22 (not shown) are possible, e.g., individual optic fibers from output end 8 to each of the surfaces 22, prisms or lens between the fiber end 8 and the surfaces 22, etc.

FIGS. 8 and 9 show magnified interference patterns typical of those that will radiate from the end 8 of fiber 4. The three negative photographs in each of FIG. 8 and 9 were obtained by viewing the end 8 of fiber 4 through a microscope and recording the pattern on film in a camera positioned at the eyepiece. The photographs show the variation in the patterns with change in microstains imposed on the optical fiber as indicated on the right-hand side of the sheet.

The system 2 further includes an artificial neural network 26, connector means 28 to operatively impose weighted portions of the electric signals from photodetector outputs 24 upon neurons 30 and strain value output means 31.

FIG. 2 illustrates one embodiment of a neural network for use in accordance with the invention. This network 26 has a first layer of neurons 30 each connected to all the outputs 24 of array 18 by connectors 32, a second layer of neurons 34 each connected to all the neurons 30 by connectors 36, and a third layer of neurons 38 each connected to all the neurons 34 by connectors 40. The value output means 31 comprises a terminal from which an analog or digital signal emits to give an statement of the value of the strain imposed under the test conditions on the optical fiber 4.

Connectors 32 useable in systems of the invention can be of various forms. For example, they may be direct wire connections. In more improved systems of the invention, they can be inline resistors of various resistive values, each being adjusted through programmed evaluation of a given system to the resistive value needed to give the highest degree of reliability of the system reported strain or other reported parameter value. In alternative systems, the connectors 32 can be any known form of signal antenuator, signal amplifier, or equivalent connector between an electrical signal output source and a receptive input.

In a typical embodiment of the invention, the number of connectors 32 between each output 24 and neurons 30 will be equal to number of neurons 30, between neurons 30 and each neuron 34 will be equal to the number of neurons 34, etc. However, it is possible in accordance with the invention, that some applications of the teachings of the invention will lead those skilled in the art to find that elimination of some of these connections do not reduce reliability of the values reported by such systems thereby reducing cost of their production and repair, or reduction or redundancy of connectors 32 have other beneficial results within the scope of this invention. Also, the number of neurons 30 need not be equal to the number of outputs 24 and the number of neurons 34 need not be equal to the number of neurons 30.

The value output means 31 of the neural network 26 may take a variety of forms. In the network 26, means 31 comprises six neurons 38 whose output signals feed into the meter 42 to register the magnitude of the strain imposed on the optical fiber 4. In other networks (not shown), some of the neurons 38, e.g., three, could feed the meter 42 while others could feed a second meter (not shown) to register polarity of the strain.

In use of the system 2 to measure strain in a structure, e.g., a wing strut, the fiber 4 may be coupled in any suitable fashion to such structure. When so assembled, some intensity of strain on will be imposed on the structure (not shown) and this, in turn, will impose a corresponding strain on the optical fiber 4. A beam of coherent light is then launched by laser 12 via the lens 14 into the input end 6 of fiber 4 to propagate in multi mode along the fiber 4 and exit the output end 8 as modal spatial intensity patterns, e.g., as shown in FIGS. 8 and 9. These irradiate the light receptor surfaces 22 of the photodetectors 20 and produce electrical signals at the signal outputs 24 which are transmitted as weighted signals in turn to the neurons 30, 34 and 36 of the artificial neural network 26 thereby displaying the value of the strain being imposed on the structure on the meter 42.

The multilayer perceptron architecture shown in FIG. 2 is a well-proven structure, and its use with back propagation for learning is a well-documented system. The multilayer perceptron training is based on back-propagation algorithms. The network is trained by providing sets of training values to the input, letting the network calculate a set of outputs, and comparing the calculated and desired outputs. The error between them is used to modify the internodal weights using an appropriate learning algoritlun. Another set of training data is then input to the network. This continues until the weight values converge to values that result in an output of sufficient accuracy for the complete set of training data. Once the network is trained, the weights are fixed, and it can be used to calculate the appropriate outputs with any similar input data, not only the training set.

We claim:

1. A system for measuring the value of a parameter which comprises:
   a single, multimode optical waveguide having an input portion and an output portion,
   means for launching monochromatic coherent light into said input portion to propagate as multi modes in said waveguide,
   an array of a plurality of spaced apart photodetectors each comprising a light receptor surface and signal output, said array being arranged to have light emitted from said waveguide output portion irradiate said light receptor surfaces,
   an artificial neural network comprising a plurality of spaced apart neurons,
   connector means to operatively impose weighted portions of said photodetector signal outputs upon said neurons and
   said neural network further comprising parameter value output means.

2. The system of claim 1 wherein said neurons are equal at least in number to the numbers of said photodetectors.

3. The system of claim 1 wherein said parameter is the tensile strain imposed upon said waveguide.

4. The system of claim 1 wherein said parameter is the temperature of said waveguide.

5. The system of claim 2 wherein said artificial neural network comprises a succession of separate layers comprising a first layer of spaced apart neurons and at least second and third layers of spaced apart neurons.

6. The system of claim 5 wherein the neurons of said first layer neurons connect with said photodetectors, said second layer neurons connect with said first layer neurons and said third layer neurons connect with said second layers neurons.

7. A system for measuring strain which comprises:
   a single, multimode longitudinal optical fiber having a core of substantially uniform circular cross-section throughout its length having an input end and an output end,
   means to launch a beam of monochromatic coherent light into said input end to propagate though said optical fiber in multi mode and exit said output end as modal spatial intensity patterns,
   an array of a plurality of spaced apart photodetectors each comprising a light receptor surface and signal output, said array being arranged to permit light emitted from said output end to irradiate said light receptor surfaces,
   an artifical neural network comprising a plurality of spaced apart neurons,
   connector means to operatively impose weighted portions of said photodetector signal outputs upon said neurons and
   said neural network further comprising strain value output means.

8. The system of claim 7 wherein said artificial neural network comprises a succession of separate layers comprising a first layer of spaced apart neurons and at least second and third layers of spaced apart neurons.

9. The system of claim 8 wherein the neurons of said first layer neurons connect with said photodetectors, said second layer neurons connect with said first layer neurons and said third layer neurons connect with said second layers neurons.

10. The method of measuring the value of a parameter which comprises:
    providing a single, multimode optical waveguide having an input portion and an output portion,
    imposing some intensity value of said parameter on said waveguide,
    launching a beam of monochromatic coherent light into said input portion so that such light propagates as multi modes in said waveguide and exits said output portion as a modal spatial intensity pattern related to said intensity of said parameter,
    providing an array of a plurality of spaced apart photodetectors each comprising a light receptor surface and signal output adjacent said output end to permit light emitted therefrom to irradiate said light receptor surfaces,
    providing an artificial neural network comprising a plurality of spaced apart neurons,
    imposing weighted portions of said photodetector signal outputs upon said neurons and
    obtaining the value of said parameter from said neural network.

11. The method of claim 10 wherein said neural network is subjected to a learning operation before said parameter value is obtained.

12. The method of measuring the value of strain imposed on a structure which comprises:
    providing a single, multimode longitudinal optical fiber of substantially uniform circular cross-section throughout its length having an input end and an output end,
    launching a beam of monochromatic coherent light into said input end to propagate in multi mode along said fiber and exit said output end as modal spatial intensity patterns,
    imposing a strain of varying value on said optical fiber,
    providing an array of a plurality of spaced apart photodetectors each comprising a light receptor surface and signal output arranged to permit light emitted from said output end to irradiate said light receptor surfaces and produce electrical signals at said signal outputs,
    providing an artificial neural network comprising a plurality of spaced apart neurons,
    imposing weighted portions of said electrical signals upon said neurons via connections between said photodetector signal outputs and said neurons, and
    obtaining the value of said strain from said neural network.

13. The method of claim 12 wherein said neural network is subjected to a learning operation before said strain value is obtained.

14. The system of claim 1 wherein said means for launching monochromatic coherent light is a laser.

* * * * *